US 008189759B2

(12) United States Patent
Couse et al.

(10) Patent No.: US 8,189,759 B2
(45) Date of Patent: May 29, 2012

(54) SYSTEM AND METHOD FOR AUTOMATIC CALL BACK USING AVAILABILITY INFORMATION

(75) Inventors: Peter Francis Couse, Ottawa (CA); Thomas A. Gray, Mansfield (CA)

(73) Assignee: Mitel Networks Corporation, Ottawa (CA)

( * ) Notice: Subject to any disclaimer, the term of this patent is extended or adjusted under 35 U.S.C. 154(b) by 1091 days.

(21) Appl. No.: 11/766,368

(22) Filed: Jun. 21, 2007

(65) Prior Publication Data

US 2008/0317232 A1    Dec. 25, 2008

(51) Int. Cl.
*H04M 3/42* (2006.01)

(52) U.S. Cl. .......... 379/209.01; 379/210.01; 379/201.1; 379/211.02; 379/142.01; 379/100.05; 455/413; 455/528

(58) Field of Classification Search ............. 379/209.01, 379/210.01, 201.06–201.09, 201.1, 142.06, 379/142.08, 142.01, 142.11; 455/415, 414.2, 455/456.1–456.3; 370/352, 355; 709/227, 709/228, 231, 234
See application file for complete search history.

(56) References Cited

U.S. PATENT DOCUMENTS

| | | | | |
|---|---|---|---|---|
| 4,166,929 A * | 9/1979 | Sheinbein | ................ | 379/209.01 |
| 5,812,865 A * | 9/1998 | Theimer et al. | ................ | 709/228 |
| 5,995,848 A * | 11/1999 | Nguyen | ........................ | 455/528 |
| 6,160,881 A * | 12/2000 | Beyda et al. | ............. | 379/209.01 |
| 6,546,096 B1 * | 4/2003 | Meiden et al. | ........... | 379/209.01 |
| 6,810,260 B1 | 10/2004 | Morales | | |
| 7,272,662 B2 * | 9/2007 | Chesnais et al. | .............. | 709/246 |
| 2002/0085701 A1 * | 7/2002 | Parsons et al. | ............ | 379/211.01 |
| 2003/0224781 A1 * | 12/2003 | Milford et al. | ............. | 455/426.1 |
| 2004/0037396 A1 * | 2/2004 | Gray et al. | .................... | 379/67.1 |
| 2005/0152527 A1 * | 7/2005 | Kent et al. | ................. | 379/211.02 |
| 2006/0003745 A1 * | 1/2006 | Gogic | ........................... | 455/413 |
| 2006/0123116 A1 * | 6/2006 | Rahman et al. | ................ | 709/227 |
| 2006/0271681 A1 * | 11/2006 | Apreutesei et al. | ........... | 709/226 |
| 2007/0147596 A1 | 6/2007 | Moser | | |
| 2008/0107250 A1 * | 5/2008 | Peuziat et al. | ........... | 379/142.01 |

FOREIGN PATENT DOCUMENTS

WO    WO02/071706 A    9/2002

OTHER PUBLICATIONS

Rosenberg et al—RFC 3261—Jun. 2002—All pages.*

* cited by examiner

*Primary Examiner* — Joseph J Nguyen

(57) ABSTRACT

A system and method are provided for controlling execution of a call back to a called party, comprising determining availability status of the called party, evaluating compatibility of the availability status with initiating call back to the called party, and in the event the availability status is compatible with call back then initiating the call back to said called party.

15 Claims, 3 Drawing Sheets

SYSTEM AND METHOD FOR AUTOMATIC CALL BACK USING AVAILABILITY INFORMATION

FIELD OF THE INVENTION

The present invention relates in general to communication systems, and more particularly to a system and method for initiating automatic call back using availability information.

BACKGROUND OF THE INVENTION

It is common for PBX call attempts to fail because a called party is absent from the location of his/her telephone, or occupied in an important task and so unable to answer the call. It is known in the PBX and CO arts to provide an "Automatic Callback" (ACB) feature whereby a caller presented with a busy or no answer condition can request that a call to the busy called party be initiated the next time the called party is available at his/her telephone (e.g. when the called party next places his/her telephone on hook). With ACB feature activated, the calling party's telephone provides a special indication (e.g. a special ring which may or may not be complemented by a display message) to indicate that the called back party is available. The calling party then goes off hook, or gives some other indication to the PBX or CO, and the call to the called party is automatically attempted.

However, the traditional ACB feature suffers from a number of drawbacks. For example, the indication of availability provided to the PBX or CO is very coarse. A user may be 'available' for an urgent call notwithstanding that the user's phone has not gone off hook in a while. Thus, an urgent call may go unanswered for a long period of time while the PBX or CO awaits the coarse indication of availability (i.e. the called party's telephone going off and then on hook). Conversely, the mere fact that a user's phone is on hook does not necessarily mean that the user is available to receive calls. The user may be dealing with others in the room, or conducting other business. Also, the ACB feature was developed at a time when portable wireless devices were not common. Portable devices exacerbate the drawbacks discussed above.

In addition to ACB, numerous other PBX features are known in the art for addressing the problem of an absent or busy user, such as call forwarding, voice mail, cellular twinning, presence and availability, and context-aware and 'hypothetical' call processing.

With call forwarding, a user can route calls to telephones that are near him/her when away from his/her primary extension. However, like the traditional ACB feature, call forwarding does not discriminate between urgent and routine incoming calls. Thus, a user might be involved in a business meeting with important visitors and therefore not wish to be disturbed by routine calls.

With voice mail, a calling party is provided with the option of leaving a voice mail message for a busy called party. However, this may not be an adequate solution for urgent calls.

Cellular twinning of a user's primary extension to a portable wireless device overcomes the problem inherent with call forwarding of being required to remember to program valid forwarding numbers. However, it does nothing to solve the other issues of indiscriminate calls being received when the user is involved with other matters. The use of ACB only amplifies the intrusiveness and disruption of ringing a wireless device in inappropriate situations.

Presence services are an emerging technology that provide information of user's availability and capabilities. Such presence services are primarily used for providing availability information of one or more users to another user of a system. This availability information includes an indication of availability or willingness of the user to engage in immediate communication. For example, Microsoft® Live Communication Server (LCS) may be configured to provide availability indicators in desktop computer applications or smart telephony device applications such that a user is provided with availability information of another user, prior to initiating communication, such as making a telephone call. However, commonly available IM systems require the user to manually set his/her availability. Errors are known to occur when a busy user neglects to continually update his/her availability status indicator. Even in implementations in which the user's status may be set automatically (e.g. an away indication being set and removed by absence and presence of computer use), the system has no way of discriminating between urgent and routine incoming calls. Also, in order to use the availability information a caller must constantly monitor the potential called party's availability, which is a time consuming and difficult task.

Context-aware call processing and hypothetical call processing systems are set forth in US Patent Publication No. US 20050100157 entitled Context Aware Call Handling System (Gray et al), the contents of which are incorporated herein by reference. According to Gray et al, a system is provided in which calls are completed according to policies which are sensitive to the 'fit' of the call within the called and calling party's context. The system of Gray et al addresses the drawback discussed above of inappropriate calls being placed to unavailable users whose phones may, nonetheless, be off hook.

An availability determination system is set forth in US Patent Publication No. US 20040037396 entitled Generation of Availability Indicators from Call Control Policies for Presence Enabled Telephony Systems (Gray et al), the contents of which are incorporated herein by reference, using the context-aware system of US 20050100157. Availability is determined for individual calling parties in specific contexts by querying the call processing for a proposed action based on a hypothetical incoming call. Call processing returns notifications of availability to potential calling parties any time there is a change in the called party's availability. The availability indicators of US 2004037396 address the issue of inappropriate use of devices by providing an accurate recommendation about user availability in his/her current context. Nonetheless, the systems of Gray et al still require a calling party to constantly monitor a called party's availability.

SUMMARY OF THE INVENTION

According to one aspect, an automatic call back (ACB) feature is provided that takes advantage of information furnished by presence and availability systems to improve the function of the ACB feature such that callback is initiated only when user availability is such that a user will actually accept an incoming call. One embodiment, as described herein, uses traditional PBX call processing in conjunction with an IM (Instant Messaging) availability system. Also, embodiments are contemplated using SIP or other IP telephony client with traditional IM and SIMPLE (SIP for Instant Messaging and Presence Leveraging Extensions) presence servers. In addition, the deficiencies discussed above relating to the use of traditional IM and presence systems are addressed by incorporating the hypothetical call processing system of US 20040037396.

According to another aspect, the alternate numbers may be stored and indexed by availability status associated with a speed dial feature. Also, the called party may be notified by a special tone or display that a more intrusive endpoint is being called.

BRIEF DESCRIPTION OF THE DRAWINGS

Embodiments of the present invention will now be described, by way of example only, with reference to the attached Figures, wherein.

DETAILED DESCRIPTION OF THE INVENTION

Figure 1:
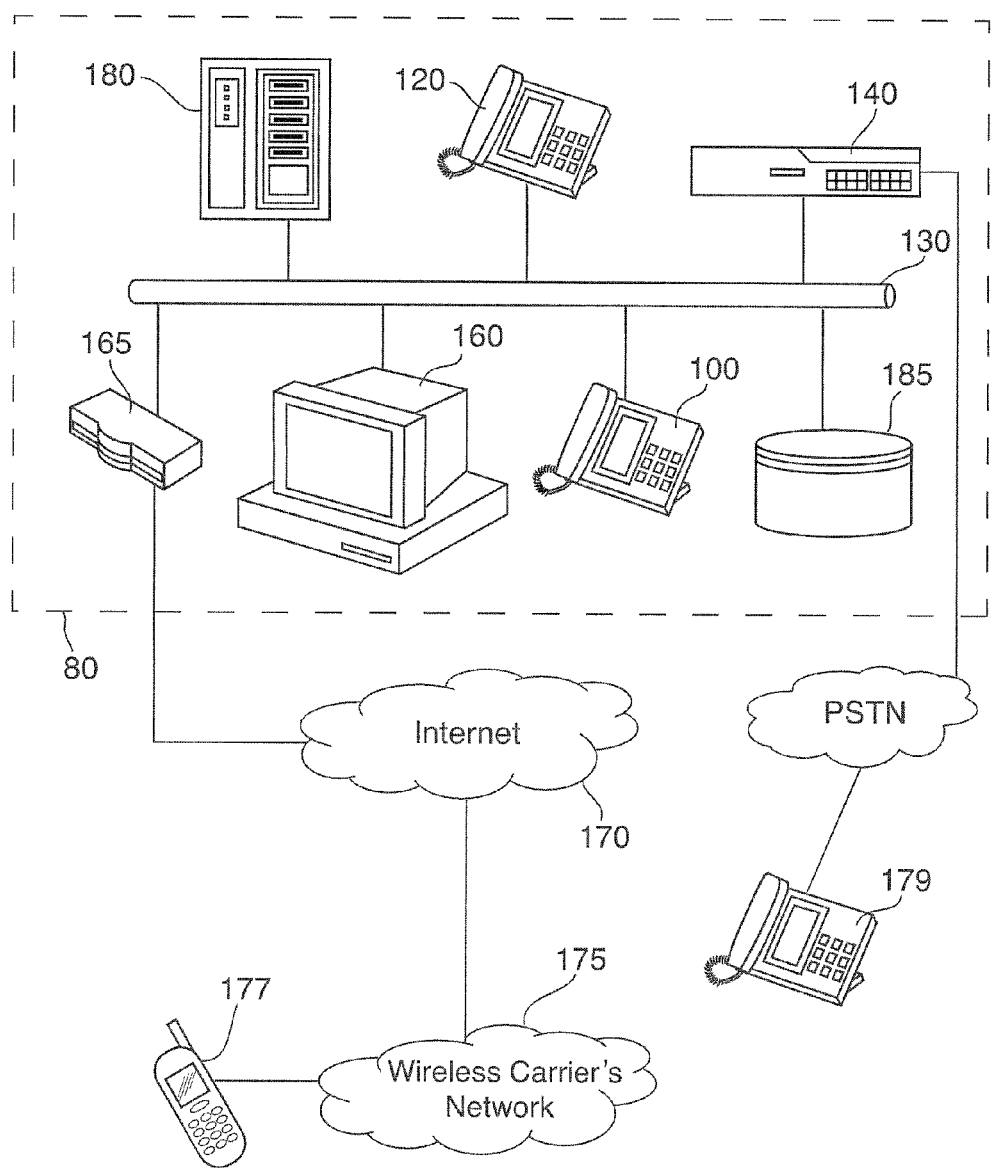
FIG. 1 is a simplified representation of a communication system for implementing a method for initiating calls using availability information, according to one embodiment of the present invention.

Reference is first made to FIG. 1 showing a communication system 80 for implementing a method for initiating automatic call back (ABC) using availability information, according to an exemplary embodiment. As shown, a first telephone device 100 of a first user (Chris) and a second telephone device 120 of a second user (Amanda) are both connected via a local area network 130 to a telephony switch 140 that is responsible for telephony connections between the first telephone device 100 and the second telephone device 120, as well as outside connections over the PSTN. The first telephone device 100 is associated with a PC 160 having software for integrating with the telephony switch 140 over LAN 130 (or directly connected to telephony device 100 using suitable APIs) to provide an interface for controlling collaborative communication features of the device 120 and PC 160 (e.g. Microsoft® Office Communicator). The user Chris at telephone device 100 uses PC 160 to activate features and specify preferences.

A router 165 connects the LAN 130 to the Internet 170 in a conventional manner. The Internet 170 may be connected to a wireless network 175 for communication with a cellular telephone 177, for having an alternate number for contacting Chris.

Likewise, Chris may be contacted at home by routing calls over the PSTN to a further alternate number that is mapped to Chris' home telephone 179.

A presence server 180 (e.g. Microsoft® LCS, Lotus® SameTime, etc.) provides presence status information to the telephone devices 100 and 120 and/or the software client on PC 160 relating to the availability of the users. It will be appreciated by those skilled in the art that the presence server 180 provides presence information by monitoring devices and applications to determine a user's presence. For the purpose of simplicity, only two telephone devices, the first telephone device 100 of Chris and the second telephone device 120 of Amanda, are shown. It will be appreciated that many other telephone devices and additional PCs can be connected to the LAN 130. It will also be appreciated that the telephony switch 140 can be any switch that handles connections between telephone devices.

A database memory 185 may also be provided for storing availability user feature selection information, as described in greater detail below.

For the purpose of the present example, the first telephone device 100 is a desk telephone connected to the telephony switch 140. Similarly, the second telephone device 120 is a desk telephone locally connected to the telephony switch 140 via LAN 130. However, the second telephone device 120 may be remotely located and connected to the telephony switch 140 over the Internet, via a VPN connection, or the like. Thus, the LAN 130 may be replaced by any suitable communications network, including the Internet, corporate Intranet, cellular network, etc.

According to the traditional ACB feature execution, if Amanda wishes to place a call (either a voice call or a multimedia call) to Chris and he does not answer the call because, for example, he is on his phone 100 with a client, Amanda may activate the Automatic Callback (ACB) feature of PBX 140. The PBX then notifies Amanda once Chris becomes available (e.g. he puts his phone 100 on hook) and presents her with the option of making an automatic call to Chris. The drawbacks of traditional ACB have been noted above. Amanda's call may be urgent but because the availability data inherent in PBX call processing is coarse (i.e. on-hook, off-hook, DND, call forward, etc.) and therefore may lead to long delays in the initiation of the callback.

Figure 2:
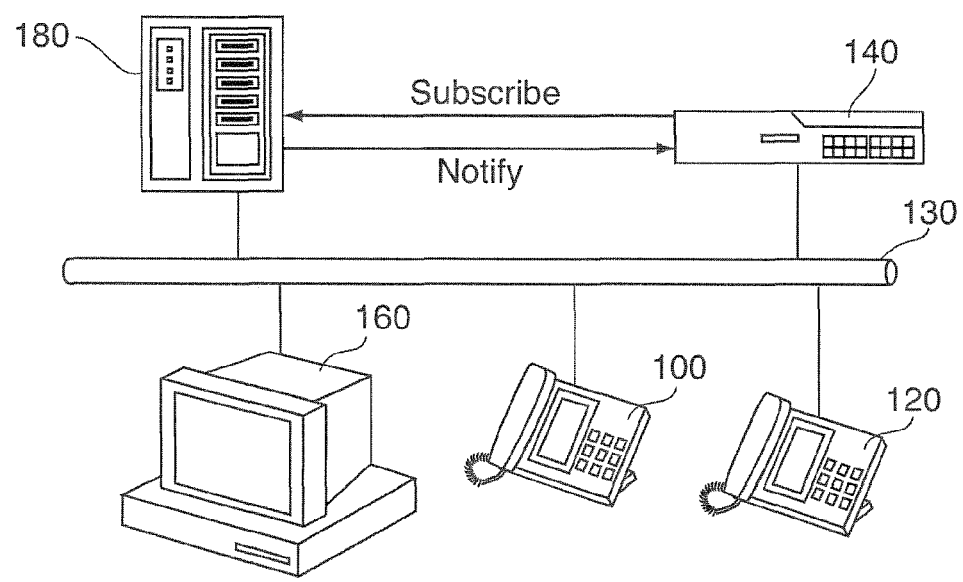
FIG. 2 is a simplified representation of the system of FIG. 1 configured such that the automatic call back (ACB) feature subscribes to a presence service.

According to a first aspect of the present invention, the ACB feature implemented by call control of PBX 140 subscribes to the presence server 180 via, for example, SIP SIMPLE, as shown in the schematic illustration of FIG. 2. The presence server 180 (or multiple presence servers) return availability information to PBX 140 in the form of a status message such as "In the Office", "Busy", "in a Meeting" etc., at predetermined intervals. The ACB feature implemented by PBX 140 evaluates each returned status message according to the contents of a list maintained within PBX 140, or alternatively in memory 185, of compatible availability states for which the user is available to answer a call. In the event the ACB feature determines from its evaluation of the list of status messages that the user's availability is compatible with the making of a call, the ACB feature is executed in the usual manner by PBX 140 to present Amanda with the option of initiating an automatic call back to Chris.

Although the implementation of FIGS. 1 and 2 includes only a single presence server 180, it is contemplated that multiple presence servers may be utilized, each capable of maintaining presence information about Chris. The PBX 140 may subscribe to any or all of these servers and receive notifications of Chris' availability status from respective servers. In such an embodiment, the ACB feature may compose the plurality of status indicators into a composite status indicator from which to make a feature implementation decision. A variety of methods can be used, such as: all status indicators must be compatible with availability, at least one status indicator must be compatible with availability, the majority of status indicators must be compatible with availability, etc.

However, as discussed in US 2004037396, even if Chris' availability status is compatible with him being available call attempts to Chris will not succeed if he enabled selected certain types of feature such as Do Not Disturb, Call Forward Always to voice mail, etc. Therefore, according to another aspect of the invention, the ACB feature implemented by PBX 140 also evaluates the features that Chris has selected on his telephone 100. These features can be provided in a list within the presence server 180, stored in database memory 185, etc. The feature compatibility information may be placed in the presence server by the PBX 140 or by another computer, such as user PC 160. In this configuration, the ACB feature will only be initiated if both Chris's current availability status and his selected features are compatible with him answering a call.

Although the implementation of FIGS. 1 and 2 includes separate a presence server 180 and PBX 140, it is contemplated the presence service may be integrated into PBX 140, and configured to respond to a particular transaction protocol by supplying either or both of Chris' status and feature compatibility information to the ACB feature. One non-limiting example is exemplified by SIP Subscribe/Notify methods wherein a user can subscribe to this type of information and as a result immediately receive a notification containing the information.

It is further contemplated that implementation of the ACB feature may be based on feature compatibility but not presence information.

In the embodiments discussed above with reference to FIGS. 1 and 2, Amanda is served by a traditional PBX 140. However, in the case of VoIP, using SIP terminology, Amanda is served by a User Agent (UA) which administers her phone 120 and a Proxy (or Proxy Agent) which handles, inter alia, feature creation. The ACB feature may be implemented on either the proxy or the UA and operates similar to the ACB implemented in PBX 140 by subscribing to Chris' availability status on the presence server 180. Likewise, Chris' feature status may be obtained from the presence server 180 or by using a transaction protocol on the proxy or UA supporting him.

Figure 3:
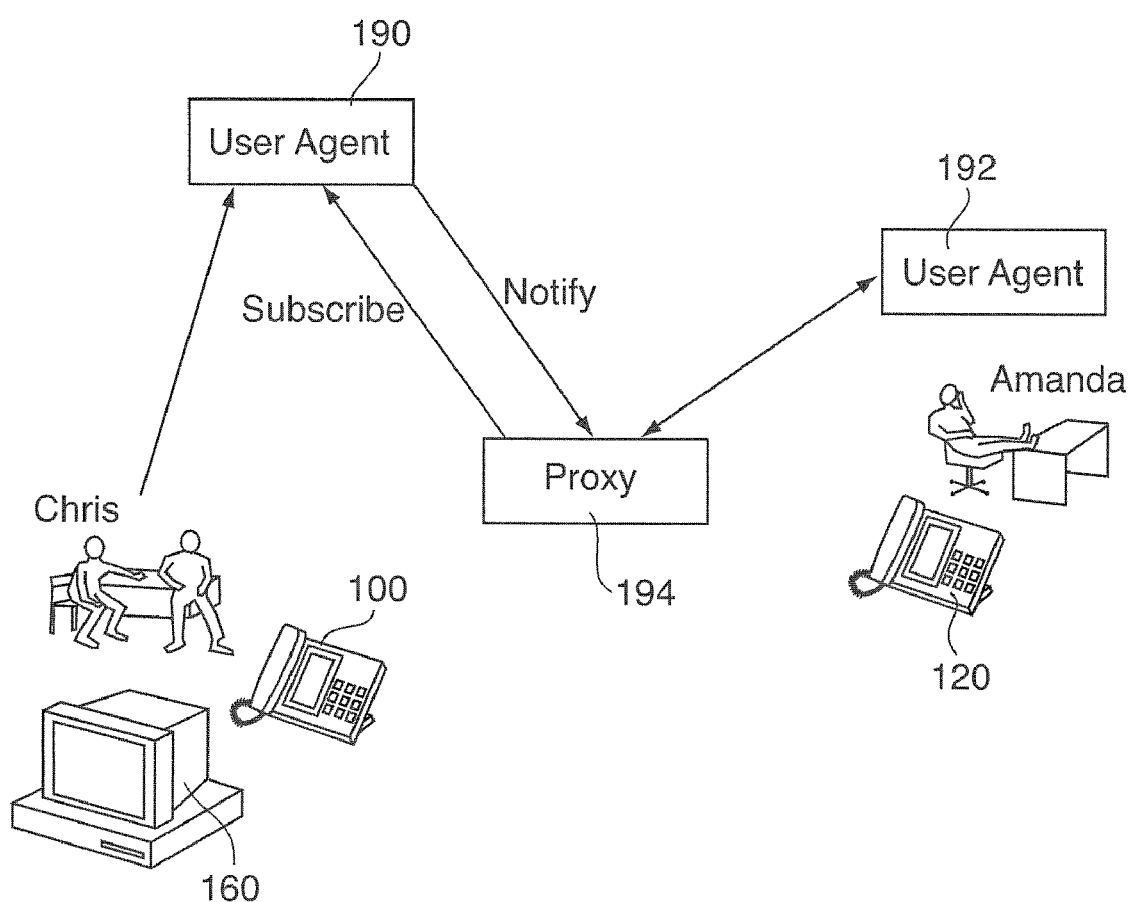
FIG. 3 is a schematic illustration of system for implementing a method for initiating calls using availability information, according to an alternative embodiment.

FIG. 3 shows the case in which both Chris and Amanda have access to a presence enabled telephony system as set forth in US 20040037396, discussed above. Both Chris and Amanda are represented by User Agents 190 and 192, and a Proxy 194 (only a single shared Proxy 194 is illustrated, although Chris and Amanda may have separate proxies). In the event that Amanda tries to initiate a call (voice or multimedia session) through her User Agent 192, session initiation is effected dependent on Chris' context, as described in US 20040037396. If Amanda's UA 192 receives a reply during the call set up negotiation phase with Chris' UA 190 that Chris is busy and has not answered the call within a predefined time out period, sent a message requesting a later call etc in this transaction, Chris' UA 190 (or Proxy 194) may offer an ACB feature to Amanda. If she accepts this feature then her UA 192 sends a hypothetical INVITE message as described in US 20040037396. The pending ACB feature then waits to receive a notification that Chris is available. When this arrives, the ACB feature then proposes initiation of a callback call to Amanda.

Although embodiments of the invention have been described and illustrated in detail, it will be appreciated that various modifications and changes can be made, all of which are believed to be within the scope of the invention as defined by the claims appended hereto.

What is claimed is:

1. A method for controlling execution of a call back to a called party, comprising:
    initiating a call attempt from a first device to a second device of said called party;
    determining that said call attempt failed;
    setting an automatic call back feature in a call controller;
    monitoring a status of said called party at a presence server;
    determining an availability status of said called party at said call controller by receiving, from said presence server at predetermined intervals, one or more status messages indicative of said called party's availability status;
    evaluating compatibility of said availability status by comparing said received status messages to a list of compatible availability states for which said called party is available to answer an incoming call;
    further determining said availability status of said called party at said call controller by evaluating compatibility of a call feature selected by said called party for said second device for availability to answer said incoming call;
    wherein the determining, said availability status comprises evaluating certain types of feature including DO NOT DISTURB and CALL FORWARD ALWAYS to voice mail is compatible with said availability; and
    in the event said availability status is compatible with said certain types of feature and said called party accepting said incoming call, then initiating said call back to said called party.

2. The method of claim 1, wherein said initiating said call back to said called party includes sending a hypothetical INVITE message to a user agent representing said called party and executing said call back upon receipt of a notification from said user agent that the called party is available.

3. The method of claim 1, wherein said evaluating further includes comparing said call feature to a list of compatible call features.

4. The method of claim 1, further comprising composing a composite status message from said one or more status messages indicative of said availability status of said called party.

5. The method of claim 4, wherein said composite status message indicates that said called party is available in the event at least one of said plurality of status messages is compatible with availability.

6. The method of claim 4, wherein said composite status message indicates that said called party is available in the event majority of said status messages are compatible with availability.

7. A system for initiating a call back to a called party by a calling party, comprising:
    a first endpoint for communicating with said called party and initiating a call attempt to said called party;
    a second endpoint for communicating with said calling party;
    at least one presence server for monitoring and maintaining availability status of said called party and in response generating one or more status messages indicative thereof at predetermined intervals; and
    circuitry associated with a call controller for,
    determining that said call attempt failed,
    setting an automatic call back feature,
    receiving said status messages from said presence server, and evaluating compatibility of said received status messages to a list of compatible availability states for which said called party is available to answer an incoming call,
    evaluating compatibility of a call feature selected by said called party for said second endpoint for availability to answer said incoming call, wherein evaluating comprises evaluating certain types of feature including DO NOT DISTURB and CALL FORWARD ALWAYS to voice mail is compatible with said availability, and
    initiating said call back to said called party only if both evaluating steps are compatible with said called party accepting said incoming call.

8. The system of claim 7, wherein said circuitry comprises a PBX for subscribing to notifications from said presence server of said availability status.

9. The system of claim 8, further comprising a memory for storing a list of compatible ones of said availability status messages against which said PBX compares said notifications.

10. The system of claim 8, wherein said circuitry initiates said call back to said called party by sending a hypothetical INVITE message to a user agent representing said called party and executing said call back upon receipt of a notification from said user agent that the called party is available.

11. The system of claim 10, wherein said circuitry compares said call feature to a list of compatible call features stored in a memory associated with said presence server, and initiates said call back only in the event said availability status and said at least one call feature are compatible with call back to said called party.

12. The system of claim 11, wherein said list of compatible call features is stored in said memory by said PBX.

13. The system of claim 8, wherein said presence server is integrated with said PBX.

14. The system of claim 7, wherein said circuitry comprises at least one of a called party user agent and proxy for subscribing to notifications from said presence server of said availability status.

15. The system of claim 7, comprising multiple presence servers for generating respective status messages, and wherein said circuitry receives said status messages and in response composes a composite status message indicative of said availability status of said called party.

\* \* \* \* \*